(12) United States Patent
Young et al.

(10) Patent No.: US 6,629,105 B1
(45) Date of Patent: Sep. 30, 2003

(54) FACILITATING USER ADMINISTRATION OF DIRECTORY TREES

(75) Inventors: Russell T. Young, Pleasant Grove, UT (US); John M. Robertson, Pleasant Grove, UT (US); Arn D. Perkins, Alpine, UT (US)

(73) Assignee: Novell, Inc., Provo, UT (US)

( * ) Notice: Subject to any disclaimer, the term of this patent is extended or adjusted under 35 U.S.C. 154(b) by 280 days.

(21) Appl. No.: 09/778,449

(22) Filed: Feb. 7, 2001

Related U.S. Application Data
(60) Provisional application No. 60/183,721, filed on Feb. 19, 2000.

(51) Int. Cl.[7] .............................................. G06F 17/30
(52) U.S. Cl. ..................................... 707/103 R; 707/10
(58) Field of Search ........................ 707/1, 3, 10, 100, 707/9, 103, 104.1, 200, 103 R; 709/223–224; 713/182; 379/100.08

(56) References Cited

U.S. PATENT DOCUMENTS

| | | | | |
|---|---|---|---|---|
| 6,097,797 | A | * | 8/2000 | Oseto ..................... 379/100.08 |
| 6,144,959 | A | * | 11/2000 | Anderson et al. .............. 707/9 |
| 6,230,269 | B1 | * | 5/2001 | Spies et al. .................. 713/182 |
| 6,272,593 | B1 | * | 8/2001 | Dujari .......................... 707/10 |
| 6,292,904 | B1 | * | 9/2001 | Broomhall et al. .......... 709/223 |
| 6,393,466 | B1 | * | 5/2002 | Hickman et al. ............ 707/100 |
| 6,408,306 | B1 | * | 6/2002 | Byrne et al. .............. 707/104.1 |
| 6,442,695 | B1 | * | 8/2002 | Dutcher et al. ............. 709/224 |
| 6,470,357 | B1 | * | 10/2002 | Garcia et al. ................ 707/200 |
| 6,484,177 | B1 | * | 11/2002 | Van Huben et al. .......... 707/10 |
| 6,490,619 | B1 | * | 12/2002 | Byrne et al. .................... 707/3 |

OTHER PUBLICATIONS

Paul Kranenburg Titled "Monitoring Utilization in an NT Workstation Lab" Proceedings of the Large Installation System Administration of Windows NT Conference Seattle, Washington, Aug. 5–8, 1998.*
Jeremy Epstein and Ravi Sandhu NetWare 4 as an example of role–based access control SIGSAC : ACM Special Interest Group on Security, Audit, and Control ACM Press New York, NY, USA Publication: 1996 ISBN:0–89791–759–6.*
Jonathan E Geibel titled "Administration of Campus Computing Labs and Faculty Desktops"Proceedings of the 27th annual ACM SIGUCCS conference on User services: Mile high expections Nov. 1999 ISBN:1–58113–144–5.*

* cited by examiner

*Primary Examiner*—Diane D. Mizrahi
(74) *Attorney, Agent, or Firm*—Dinsmore & Shohl LLP

(57) ABSTRACT

The mechanism provides tools and techniques for administering a directory tree of a directory service database by automatically placing user objects in containers and placing containers on servers, without direct instructions from a user. Methods of the mechanism use a hash function to hash a user ID to obtain a proposed directory tree location, and then place a user object for the user at the proposed location. The hash function results may be stored within an email address of the user for later reference. Some methods of the invention also automatically divide containers of the tree between servers, and some automatically move subtrees of user objects into a new partition when a server or server pair is added to a system that stores the directory tree. Similar systems and configured storage media are also provided by the invention to perform user object placement tasks.

23 Claims, 2 Drawing Sheets

FACILITATING USER ADMINISTRATION OF DIRECTORY TREES

RELATED APPLICATIONS

This application claims priority to commonly owned copending application Ser. No. 60/183,721 filed Feb. 19, 2000, which is incorporated herein by reference.

FIELD OF THE INVENTION

The present invention relates to the management of computer directory service databases, and relates more particularly to tools and techniques which allow directory service users to readily take over directory tree management tasks that were traditionally handled by specially trained directory service database administrators instead of users.

TECHNICAL BACKGROUND OF THE INVENTION

A directory service database contains data representing users, network resources, access rights, contact information, and/or similar data to facilitate locating people and using resources. Novell's NDS directory service supports one or more trees of objects; objects in a-tree may represent network users and/or network resources, for instance (NOVELL and NDS are marks of Novell, Inc.). In traditional corporate environments, specially trained administrative personnel organize and maintain NDS trees by adding or removing users, setting access controls, placing objects at appropriate positions within a tree, partitioning the tree, and associating the tree's partitions (which are also known as "replicas") with particular servers. For instance, if a corporation has two or more geographically separate offices, the administrator may improve NDS efficiency by placing together in a partition the user objects for the users who work at a given office, and then making the primary server for that partition be a server which is geographically close to that office.

However, traditional approaches to using NDS or another partitioned hierarchical directory service database have drawbacks if the users are going to be entered into the directory service over the Internet and/or access the directory service through the Internet. Such access is a relatively new but increasingly likely occurrence.

To some extent, users of an Internet-hosted directory service will need to take over tasks that were traditionally handled by specially trained administrators, such as NDS administrators. For most of these users, it is unrealistic to assume that their employer will provide a directory service administrator. Some administrative assistance may be available, but it would probably be provided by Internet Service Providers instead of being provided by personnel who have been trained specifically in directory service internals and administration.

In particular, users utilize the Internet to access the new Novell DigitalMe service (described, for instance, at http://www.digitalme.com/), or a similar service, and thus to access the underlying database. Such directory service users may seek access from many locations instead of a few, so partitioning according to a few geographic locations no longer makes as much sense as it did (and does) in managing a directory service whose users are mainly employees of a single entity. It is initially unclear how users should be placed in directory tree(s) and how a given directory tree should be partitioned, at least if one looks to user location for guidance as one did traditionally.

Thus, it would be an advancement in the art to provide better tools and techniques for helping users of a directory service database perform administrative tasks to manage that database.

Such improved tools and techniques are disclosed and claimed herein.

BRIEF SUMMARY OF THE INVENTION

The present invention provides tools and techniques for administering a directory tree of a directory service hierarchical database, and in particular, for placing user objects in containers and placing containers on servers, without direct instructions or guidance from a user. For instance, methods of the invention use a hash function to hash a user ID to obtain a proposed directory tree location, and then place a user object for the user (that is, a user object having the hashed user ID) at the proposed location in the directory tree. In some cases, the placing step places the user object in a balanced directory tree, while in other cases the tree is not balanced. The hash function results may be stored within an email address of the user for later reference, or they may be recomputed as needed. Some methods of the invention also automatically divide containers of the tree between servers, and some automatically move subtrees of user objects into a new partition when a server or server pair is added to a system that stores the directory tree. Similar systems and configured storage media are also provided by the invention, to perform user object placement tasks that would otherwise traditionally call for a specially trained database administrator. Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing embodiments of the invention, the meaning of several important terms is clarified, so the claims must be read with careful attention to such clarification. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file. In particular, an "embodiment" of the invention may be a system, an article of manufacture, a method, and/or a signal which configures a computer memory or other signal medium.

Figure 1:
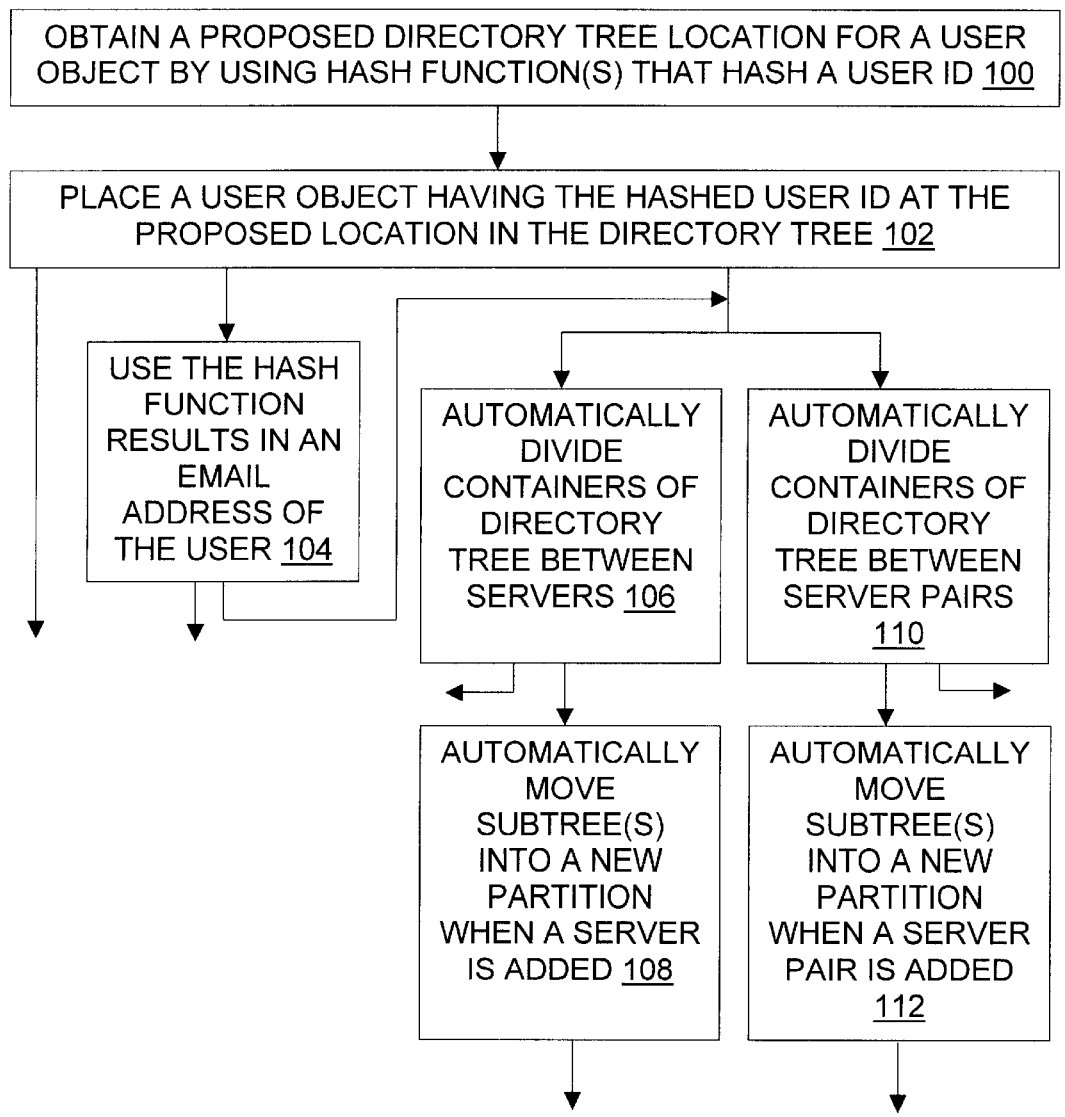
FIG. 1 is a flowchart illustrating methods of the present invention, and thus also illustrating configured storage media according to the invention.
Figure 2:
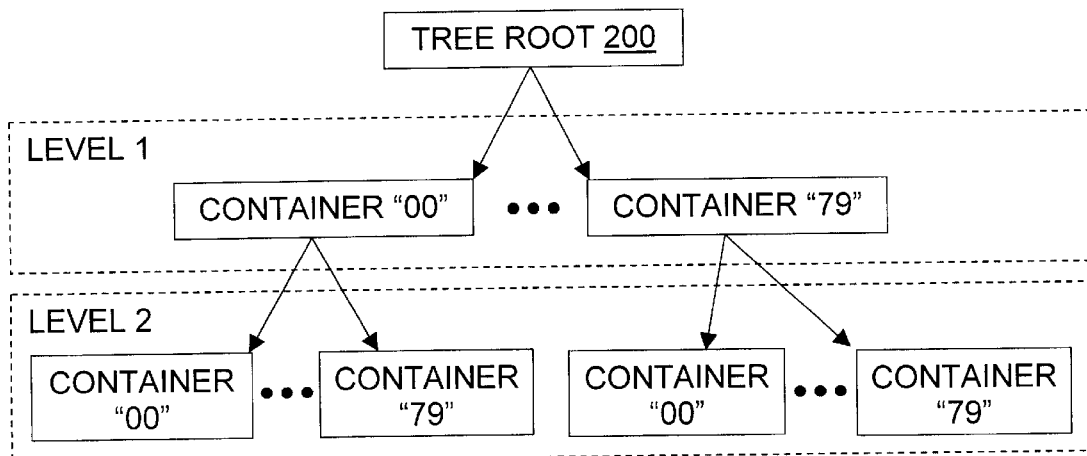
FIG. 2 is a diagram illustrating one of many possible directory service database trees suitable for management with methods of the present invention.

FIG. 1 illustrates methods of the present invention. Reference is also made to FIG. 2, which illustrates a database directory service tree, and to FIG. 3, which illustrates systems of the present invention. Some methods of the invention omit one or more illustrated steps; some methods repeat steps, group steps differently, and/or perform them in a different order than that shown. Likewise, some systems according to the invention omit or repeat illustrated components. Acceptable variations will be apparent to those of skill in the art in view of the teachings herein and the claims.

Users 300 access a directory service over a network such as the Internet 302. Users are represented by user objects in a database in the directory service, such as a hierarchical partitioned replicated database like the Novell NDS database or an X.500 database. The invention provides tools and techniques for distributing user objects in a directory tree of such a database. One aspect of the present invention spreads user objects throughout containers based on user IDs instead of user location. In one embodiment, a root server 304 configured by software 310 distributes user objects and associated container objects (collectively identified as 316 or as 322 in the Figure) among partitions (such as partitions 314 and 320) among servers or server pairs 312, 318, as explained below.

Placement of user objects throughout a directory tree may be accomplished by defining a balanced tree of container objects, such as the tree illustrated in FIG. 2, and then using a hash function to assign the user IDs (and hence the corresponding user objects) to locations in the tree, with methods such as those illustrated in FIG. 1.

The number of containers in the tree can be determined by estimating the maximum number of users per container and the total expected user count. For instance, if one assumes a maximum of 5000 users per container and a two-level tree with an 80 container branch-out per level, then the total user count is 80×80×5000=32 million. Accordingly, the illustrative tree shown in FIG. 2 has 80 children per parent. Of course, one advantage of this approach is its scalability, so these numbers are merely examples. In an alternative embodiment, a three-level tree with branch-outs of 10 (at the root) then 8 and then 80 is used; this 10×8×80 implementation give the same total maximum user count of 32 million, but makes partitioning easier because there are only 10 partitions instead of 80.

During a location obtaining step 100, software 310 which configures a server 304 is executed by the server processor 306 in conjunction with the server memory 308 to identify a proposed directory tree location for a user object. User objects correspond to directory service users 300. Each user 300 has a unique user ID. During step 100, user IDs can be hashed into directory service tree container locations using any hash function(s) which are sufficiently cheap to compute and which provide relatively uniformly distributed results. Once a proposed location is obtained 100, the software can place the user object in the directory tree at the proposed location, during a step 102. Familiar tools for inserting adding user objects at a specified location can be used.

For instance, if one uses a two-level tree with a branch-out of 80 as suggested above, one can label each set of sibling containers 00 through 79 as shown in FIG. 2. User ID strings with at least three characters can then be hashed during step 100 as follows:

level 1 container=(user_id[0]*user_id[len−1]*len) modulo 80 level 2 container=(user_id[1]*user_id[len−1]*len) modulo 80 where len=number of characters in the user ID string, and user_id[i] is the integer ASCII value of the i'th character in the user ID string. For instance, if the user's name in the system is "george" then we have:

$$\text{level 1 container} = (\text{ascii}('g')*\text{ascii}('e')*6) \text{modulo } 80$$
$$= (103*101*6) \text{modulo } 80$$
$$= 18$$
$$\text{level 2 container} = (\text{ascii}('e')*\text{ascii}('e')*6) \text{modulo } 80$$
$$= (101*101*6) \text{modulo } 80$$
$$= 6$$

With reference to FIG. 2, this would lead to placing 102 the user ID "george" in container 06 of the level 2 containers, underneath container 18 of the level 1 containers. Of course, other hash functions may also be used in other embodiments of the invention. Indeed, in a more recent embodiment a different hash function is used. If one uses a two-level tree with a branch-out of 80 as suggested above, one can label each set of sibling containers 00 through 79 as shown in FIG. 2. User ID strings with at least three characters can then be hashed during step 100 as follows:

level 1 container=(user_id[0]*user_id[len−1]*(len&1)) modulo 80 level 2 container=(user_id[1]*user_id[len−1]*(len&1)) modulo 80

The difference is that 'len' is forced to an odd value so that the resultant hash has a more even distribution across the containers. When left unchanged, the original hash favored even numbered containers 3-to-1. After the change, even numbered containers were no longer favored. With the newer hash function, if the user's name in the system is "george" then we have:

$$\text{level 1 container} = (\text{ascii}('g')*\text{ascii}('e')*6) \text{modulo } 80$$
$$= (103*101*7) \text{modulo } 80$$
$$= 21$$
$$\text{level 2 container} = (\text{ascii}('e')*\text{ascii}('e')*6) \text{modulo } 80$$
$$= (101*101*7) \text{modulo } 80$$
$$= 47$$

Regardless of the difference between the hash functions, collisions can be handled using conventional tools and techniques; hash functions and their use in general are well known, although their specific use in placing directory service user objects as claimed here is believed to be novel.

The hash results may optionally be stored during a step 104 in an expanded user ID. For instance, if periods '.' are used as separators, and the user ID is the email name for a mailbox in a DigitalMe or similar service domain, then this user's email address could be written as "george.18.6@digitalme.com". Alternately, the hash results can be recomputed each time they are needed. In particular, and without limitation, the hash results can be recomputed during a user lookup. One advantage of computing the hash value on a user ID is that it permits computationally efficient lookups which use hashing instead of a more expensive mechanism such as a directory search.

In some embodiments, a system comprising the software 310 automatically divides (step 106 and/or step 110) containers into database partitions such as partitions 314 and 320 based on the directory service tree presented and the number of available servers/server pairs such as servers/server pairs 312 and 318. A direct command from a user 300 identifying particular containers or particular servers is not needed. Both step 106 and step 110 divide containers; step 106 assigns containers to servers, while alternate step 110 assigns containers to server pairs. A given system could include both sole servers and server pairs, so that both step 106 and step 110 are performed. For convenience, components 312 and 318 in the illustration represent servers and/or server pairs, depending on the particular embodiment in question.

As an example, assume the same 80×80 tree discussed above, and assume eight servers are available. In one embodiment, the system first associates the servers in pairs, so one server can be the primary (normally active) server and the other can be a backup/failsafe/stand-by/secondary/archive server. Then the containers are divided 110 among the server pairs. In this example, level 1 containers 00–19 would form one partition which is kept on the first server pair 312, level 1 containers 20–39 would form a second partition which is kept on the second server pair, level 1 containers 40–59 would form a third partition which is kept on the third server pair, and level 1 containers 60–79 would form a fourth partition which is kept on the fourth server pair 318. In each case, the level 2 children of a given container would be kept on the same server pair as their parent.

Unlike some conventional approaches, this use of server pairs according to the invention provides redundancy without requiring that every server have a copy of every partition, or that more than two servers have a copy of a given partition. This is especially advantageous if the database is large, since it frees server and network resources that would otherwise be spent supporting replicas.

Figure 3:
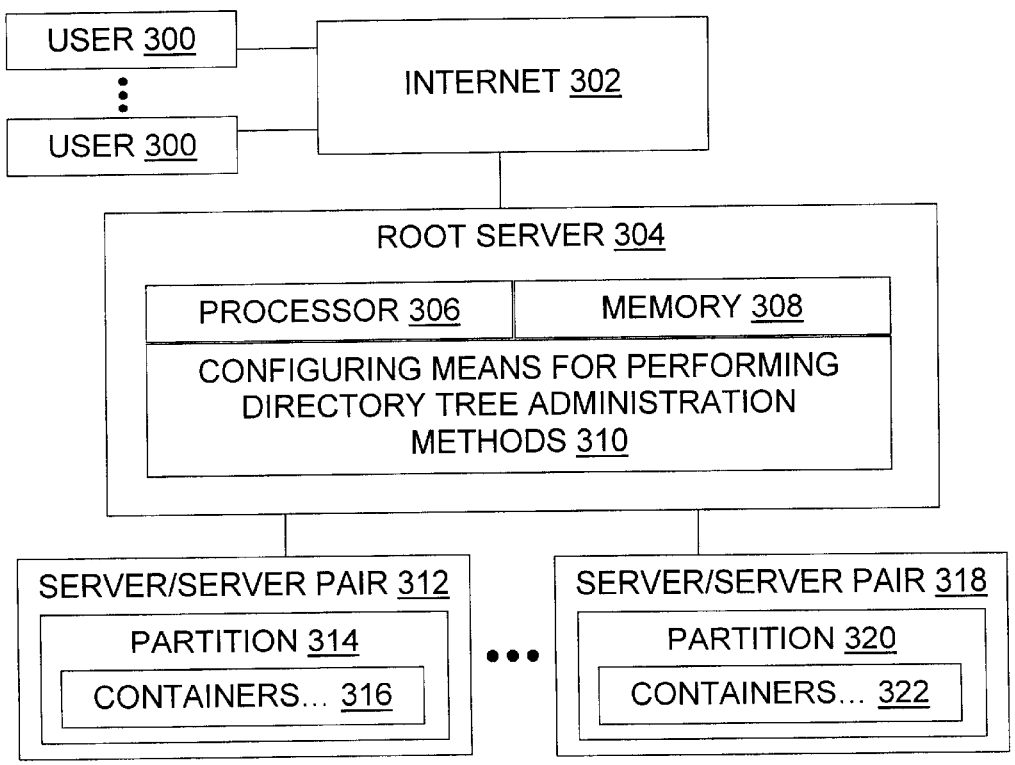
FIG. 3 is a diagram illustrating systems of the present invention.

An alternate embodiment behaves in a similar manner, but uses individual servers instead of server pairs. This embodiment is illustrated in FIG. 3 by viewing components 312 and 318 as individual servers rather than server pairs, and by following step 106 of FIG. 1 rather than step 110.

In one embodiment, a background process or a service 310 detects (or is informed of) the addition of a new server pair. In response, it incrementally redistributes 108/112 the containers and redefines the partitions to balance the containers among all servers, including the new ones. For instance, if a fifth server pair was added to the four pairs discussed above, then the last four containers of each partition could be moved 112 to the new server pair, so pair one has level 1 containers 00 . . . 15, pair two has level 1 containers 20 . . . 35, and so on, with the fifth server pair having a new partition holding level 1 containers 16 . . . 19, 36 . . . 39, and so forth. Likewise, if an individual server were added to a system already having four servers, then the container subtrees could be automatically moved 108 into a new partition on the fifth server. In either case, the step in question (108 or 112) could be implemented using server objects in the tree to represent servers, and familiar tools and techniques for moving directory service subtrees.

The steps 106–112 are "automatic" in the sense that direct commands from a user identifying particular containers or particular servers are not required. Thus, users 300 need not concern themselves with that level of detail in order to place or move user objects.

Systems according to the invention may include individual computers and/or computer networks which have been configured through software 310 and/or special-purpose hardware 310 (e.g., ASICs, Field Programmable Gate Arrays, etc. configured to provide like functionality) to operate according to the invention. Suitable computer networks 302 include, by way of example, local networks, wide area networks, and/or the Internet. "Internet" as used herein includes variations such as a private Internet, a secure Internet, a value-added network, a virtual private network, or an intranet. The computers by which users 300 are connected by the network, and the servers such as servers 304, 312, and 318 used according to the invention may be workstations, laptop computers, disconnectable mobile computers, servers, computing clusters, mainframes, or a combination thereof. Although the software 310 is shown for convenience of illustration on a single server, it may also be distributed between servers. The computer hardware may initially be general-purpose, special purpose, stand-alone, and/or embedded; general-purpose hardware is configured by software 310 to operate according to the invention. The network 302 may include or connect to other networks, such as one or more LANs, wide-area networks, wireless networks (including infrared networks), Internet servers and clients, intranet servers and clients, or a combination thereof, through a gateway or similar mechanism.

The network of servers 304, 312, 318 may include Novell Netware® network operating system software (NETWARE is a registered trademark of Novell, Inc.), NetWare Connect Services, VINES, Windows NT, Windows 95, Windows 98, Windows 2000, Windows XP, LAN Manager, or LANtastic network operating system software, UNIX, TCP/IP and NFS-based systems, Distributed Computing Environment software, SAA software (VINES is a trademark of Banyan Systems; NT, WINDOWS 95, WINDOWS 98, WINDOWS 2000, WINDOWS XP, and LAN MANAGER are marks of Microsoft Corporation; LANTASTIC is a trademark of Artisoft; SAA is a mark of IBM).

One system according to the invention includes several servers that are connected by network signal lines to one another and/or to one or more network clients. The servers and network clients may be configured by those of skill in the art in a wide variety of ways to operate according to the present invention. The servers or clients may be uniprocessor or multiprocessor machines. The servers and clients each include an addressable storage medium such as random access memory and/or a non-volatile storage medium such as a magnetic or optical disk. The signal lines may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media.

In addition to the computers, a printer, an array of disks, and/or other peripherals may be attached to a particular system. A given computer may function both as a client and a server; this may occur, for instance, on computers running Microsoft Windows NT software. Although particular individual and network computer systems and components are identified here, those of skill in the art will appreciate that the present invention also works with a variety of other networks and computers.

The servers 304, 312, 318 and the network clients and individual computers are capable of using floppy drives, tape drives, optical drives or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM, flash memory, and other computer system storage devices. The substrate configuration represents data and instructions which cause the computer system to operate in a specific and predefined manner as described herein. Thus, the medium tangibly embodies a program, functions, and/or instructions that are executable by the servers and/or network client computers and/or individual computers to perform at least one method for administering a directory tree of a directory service hierarchical database. The method steps embodied in a configured computer program storage medium need not be limited to an exact correspondence with the steps recited in the method claims, although such a correspondence is permitted.

The invention also provides novel signals which are used in or by such programs. Inventive signals may be embodied in computing systems, in computer-readable storage media (volatile and/or non-volatile), and/or in "wires", RAM, disk, or other storage media or data carriers in a network such as the network.

Suitable software and/or hardware implementations of the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools. In particular, software 310 for performing the methods illustrated in FIG. 1 may be implemented in languages such as C++ by those familiar with published Novell NDS Application Programmer Interfaces.

As used herein, terms such as "a" and "the" and designations such as "user ID" and "server" are inclusive of one or more of the indicated element. In particular, in the claims a reference to an element generally means at least one such element is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for administering a directory tree of a directory service hierarchical database, the method comprising:

defining a directory tree of container objects;

using at least one hash function to hash a user ID to automatically obtain a proposed directory tree location within the directory tree; and automatically placing a user object for the user having the hashed user ID at the proposed location in the directory tree without a direct command from a user.

2. The method of claim 1, wherein the placing step places the user object in a balanced directory tree.

3. The method of claim 1, further comprising the step of using the hash function results within an email address of the user.

4. The method of claim 1, further comprising the step of recomputing the hash function results during a user lookup.

5. The method of claim 1, further comprising the step of automatically dividing containers of the tree between servers.

6. The method of claim 5, further comprising the step of automatically moving subtrees into a new partition when a server is added to a system that stores the directory tree.

7. The method of claim 1, further comprising the step of automatically dividing containers of the tree between server pairs.

8. The method of claim 7, further comprising the step of automatically moving subtrees into a new partition when a server pair is added to a system that stores the directory tree.

9. A system for administering a directory tree of a directory service hierarchical database, comprising:

at least one computer with a processor and a memory connected to the processor; and a means configuring the computer to perform a directory tree administration method, the method comprising:

using at least one hash function to hash a user ID to obtain a proposed directory tree location; and automatically placing a user object for the user having the hashed user ID at the proposed location in the directory tree, wherein the proposed directory tree location is based upon the hashed user ID and is not based upon the user location.

10. The system of claim 9, wherein the placing step places the user object in a balanced directory tree.

11. The system of claim 9, wherein the method further comprises the step of using the hash function results within an email address of the user.

12. The system of claim 9, wherein the method further comprises the step of automatically dividing containers of the tree between servers.

13. The system of claim 12, wherein the method further comprises the step of automatically moving subtrees into a new partition when a server is added.

14. The system of claim 9, wherein the method further comprises the step of automatically dividing containers of the tree between server pairs.

15. The system of claim 14, wherein the method further comprises the step of automatically moving subtrees into a new partition when a server pair is added.

16. A configured computer-readable storage medium, the medium configured to perform a method for administering a directory tree of a directory service database, the method comprising:

using at least one hash function to hash a user ID to obtain a proposed directory tree location, wherein the proposed directory tree location is based upon the hashed user ID and is not based upon the user location; and placing a user object for the user having the hashed user ID at the proposed location in the directory tree.

17. The configured medium of claim 16, wherein the placing step places the user object in a balanced directory tree.

18. The configured medium of claim 16, wherein the method further comprises the step of storing at least a portion of the hash function results within an email address of the user.

19. The configured medium of claim 16, wherein the method further comprises the step of automatically dividing containers of the tree between at least two servers or server pairs.

20. The configured medium of claim 16, wherein the method further comprises the step of automatically moving user objects into a new partition when at least one of a server and a server pair is added to a system that stores the directory tree.

21. The configured medium of claim 16, wherein the method further comprises the step of defining a balanced tree of container objects prior to at least the placing step.

22. A method for administering a directory tree of a directory service hierarchical database, the method comprising:

using at least one hash function to hash a user ID to obtain a proposed directory tree location;

placing a user object for the user having the hashed user ID at the proposed location in the directory tree;

automatically dividing containers of the tree between servers; and automatically moving subtrees into a new partition when a server is added to a system that stores the directory tree.

23. A configured computer-readable storage medium, the medium configured to perform a method for administering a directory tree of a directory service database, the method comprising:

using at least one hash function to hash a user ID to obtain a proposed directory tree location;

placing a user object for the user having the hashed user ID at the proposed location in the directory tree; and automatically moving user objects into a new partition when at least one of a server and a server pair is added to a system that stores the directory tree.

* * * * *